(12) United States Patent
Saitoh et al.

(10) Patent No.: US 8,376,895 B2
(45) Date of Patent: Feb. 19, 2013

(54) AUTOMATIC TRANSMISSION

(75) Inventors: Noriaki Saitoh, Wako (JP); Soichi Sugino, Wako (JP); Toshikazu Kouno, Wako (JP); Kohei Iizuka, Wako (JP); Mariko Shibamura, Wako (JP); Shoji Machida, Wako (JP); Jorg Muller, Chemnitz (DE); Rico Resch, Wilsdruff (DE); Mirko Leesch, Thum (DE)

(73) Assignee: Honda Motor Co., Ltd., Tokyo (JP)

( * ) Notice: Subject to any disclaimer, the term of this patent is extended or adjusted under 35 U.S.C. 154(b) by 4 days.

(21) Appl. No.: 13/282,468

(22) Filed: Oct. 27, 2011

(65) Prior Publication Data

US 2012/0115670 A1 May 10, 2012

(30) Foreign Application Priority Data

Nov. 4, 2010 (JP) ................................ 2010-247801

(51) Int. Cl.
*F16H 3/62* (2006.01)

(52) U.S. Cl. ........................................ 475/278; 475/275
(58) Field of Classification Search ................... None
See application file for complete search history.

(56) References Cited

U.S. PATENT DOCUMENTS 7,632,206 B2 * 12/2009 Gumpoltsberger ........... 475/275

FOREIGN PATENT DOCUMENTS

| JP | 2000-161450 | 6/2000 |
| JP | 2001-182785 | 7/2001 |
| JP | 2002-323098 | 11/2002 |
| JP | 2005-273768 | 10/2005 |

* cited by examiner

*Primary Examiner* — David D Le
*Assistant Examiner* — Erin D Bishop
(74) *Attorney, Agent, or Firm* — Ditthavong Mori & Steiner, P.C.

(57) ABSTRACT

An automatic transmission includes an input shaft, an output member, a first planetary gear set, a second planetary gear set, a third planetary gear set, a fourth planetary gear set, and an engagement mechanism. The engagement mechanism includes first to sixth engagement assemblies. Each of a plurality of gear ratios is provided by setting three of the first to sixth engagement assemblies in a engagement state.

10 Claims, 7 Drawing Sheets

FIG. 2A

|  | Q1 | Q2 | Q3 | Q4 | Q5 | Q6 | GEAR RATIO |
|---|---|---|---|---|---|---|---|
| RVS |  | ○ | ○ |  | ○ |  | 4.008 |
| 1st |  |  | ○ | ○ | ○ |  | 5.233 |
| 2nd |  |  |  | ○ | ○ | ○ | 3.367 |
| 3rd |  | ○ |  | ○ | ○ |  | 2.298 |
| 4th |  | ○ |  | ○ |  | ○ | 1.705 |
| 5th | ○ | ○ |  | ○ |  |  | 1.363 |
| 6th | ○ | ○ |  |  |  | ○ | 1 |
| 7th | ○ | ○ |  |  | ○ |  | 0.786 |
| 8th | ○ |  |  |  | ○ | ○ | 0.657 |

FIG. 2B

| PLANETARY GEAR SET | GEAR RATIO |
|---|---|
| P1 | 2.734 |
| P2 | 1.914 |
| P3 | 2.681 |
| P4 | 1.614 |

FIG. 4

|     | Q1 | Q2 | Q3 | Q4 | Q5 | Q6 |
|-----|----|----|----|----|----|----|
| RVS |    | ○  | ○  |    | ○  |    |
| 1st |    |    | ○  | ○  |    | ○  |
| 2nd |    |    |    | ○  | ○  | ○  |
| 3rd |    | ○  |    | ○  | ○  |    |
| 4th |    | ○  |    | ○  |    | ○  |
| 5th | ○  |    |    | ○  |    | ○  |
| 6th | ○  | ○  |    |    |    | ○  |
| 7th | ○  | ○  |    |    | ○  |    |
| 8th | ○  |    |    |    | ○  | ○  | ary engagement status of engagement assemblies.

AUTOMATIC TRANSMISSION

CROSS-REFERENCE TO RELATED APPLICATIONS

The present application claims priority under 35 U.S.C. §119 to Japanese Patent Application No. 2010-247801, filed Nov. 4, 2010, entitled "Automatic Transmission". The contents of this application are incorporated herein by reference in their entirety.

BACKGROUND OF THE INVENTION

1. Field of the Invention

The present invention relates to an automatic transmission.

2. Discussion of the Background

In automatic transmissions for vehicles, increasingly large numbers of gear speeds have been employed to improve the running performance and drivability of vehicles. An automatic transmission generally includes planetary gear sets and engagement assemblies including a clutch and a brake. The automatic transmission performs gear changes by changing power transmission routes from one to another by using the engagement assemblies. Thus, the number of gear speeds can be increased by increasing the number of planetary gear sets or engagement assemblies. For example, Japanese Unexamined Patent Application Publication No. 2005-273768 discloses an automatic transmission that achieves eight forward speeds by using three planetary gear sets and six engagement assemblies.

When an engagement assembly, such as a wet clutch, is disengaged (or released), the engagement assembly may cause a frictional loss due to what is called drag. As the number of engagement assemblies is increased to increase the number of gear speeds, the number of engagement assemblies that are disengaged at each gear speed increases accordingly. For example, in the automatic transmission described in Japanese Unexamined Patent Application Publication No. 2005-273768, at each gear speed, two engagement assemblies are engaged while the remaining four engagement assemblies are disengaged. As more engagement assemblies become disengaged, more frictional losses may occur.

SUMMARY OF THE INVENTION

According to one aspect of the present invention, an automatic transmission comprises an input shaft, an output member, a first planetary gear set, a second planetary gear set, a third planetary gear set, a fourth planetary gear set, and an engagement mechanism. The input shaft is configured to be rotated with power of a driving source relative to a casing member. Rotation of the input shaft is changed into rotation at a plurality of rotational speeds through a plurality of gear ratios. The output member is to output rotation of the input shaft. The first planetary gear set includes a first sun gear, a first ring gear, and a first carrier supporting a first pinion gear. The second planetary gear set includes a second sun gear, a second ring gear, and a second carrier supporting a second pinion gear. The third planetary gear set includes a third sun gear, a third ring gear, and a third carrier supporting a third pinion gear. The fourth planetary gear set includes a fourth sun gear, a fourth ring gear, and a fourth carrier supporting a fourth pinion gear. The engagement mechanism includes first to sixth engagement assemblies. The first sun gear, the first ring gear, and the first carrier are defined as a first rotary element, a second rotary element, and a third rotary element in the first planetary gear set. The second sun gear, the second ring gear, and the second carrier are defined as a first rotary element, a second rotary element, and a third rotary element in the second planetary gear set. The third sun gear, the third ring gear, and the third carrier are defined as a first rotary element, a second rotary element, and a third rotary element in the third planetary gear set. The fourth sun gear, the fourth ring gear, and the fourth carrier are defined as a first rotary element, a second rotary element, and a third rotary element in the fourth planetary gear set. Each of the first to sixth engagement assemblies is configured to releasably couple at least two of the first to third rotary elements included in each of the first to fourth planetary gear sets to each other, to releasably couple the input shaft to at least one of the first to third rotary elements included in each of the first to fourth planetary gear sets, or to releasably couple at least one of the first to third rotary elements included in each of the first to fourth planetary gear sets to the casing member. The first rotary element of the first planetary gear set is coupled to the input shaft. The first rotary element of the second planetary gear set is coupled to the output member. The first rotary element of the third planetary gear set is releasably coupled to the input shaft via the first engagement assembly. The first rotary element of the fourth planetary gear set is releasably coupled to the input shaft via the second engagement assembly. The second rotary element of the first planetary gear set, the second rotary element of the third planetary gear set, and the second rotary element of the fourth planetary gear set are coupled to one another via a first joint member. The third rotary element of the first planetary gear set and the second rotary element of the second planetary gear set are coupled to each other via a second joint member. The third rotary element of the second planetary gear set and the first rotary element of the third planetary gear set are coupled to each other via a third joint member. The third joint member and the casing member are releasably coupled to each other via the third engagement assembly. The third rotary element of the third planetary gear set and the casing member are releasably coupled to each other via the fourth engagement assembly. The third rotary element of the fourth planetary gear set and the casing member are releasably coupled to each other via the fifth engagement assembly. The second joint member and the third rotary element of the fourth planetary gear set are releasably coupled to each other via the sixth engagement assembly. Each of the plurality of gear ratios is provided by setting three of the first to sixth engagement assemblies in a engagement state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 2A is an engagement chart for showing an exemplary engagement status of engagement assemblies.

FIG. 2B is a chart for showing gear ratios of planetary gear sets.

FIG. 4 is an engagement chart for showing another exemplary engagement status of engagement assemblies.

DESCRIPTION OF THE EMBODIMENTS

Figure 1A:
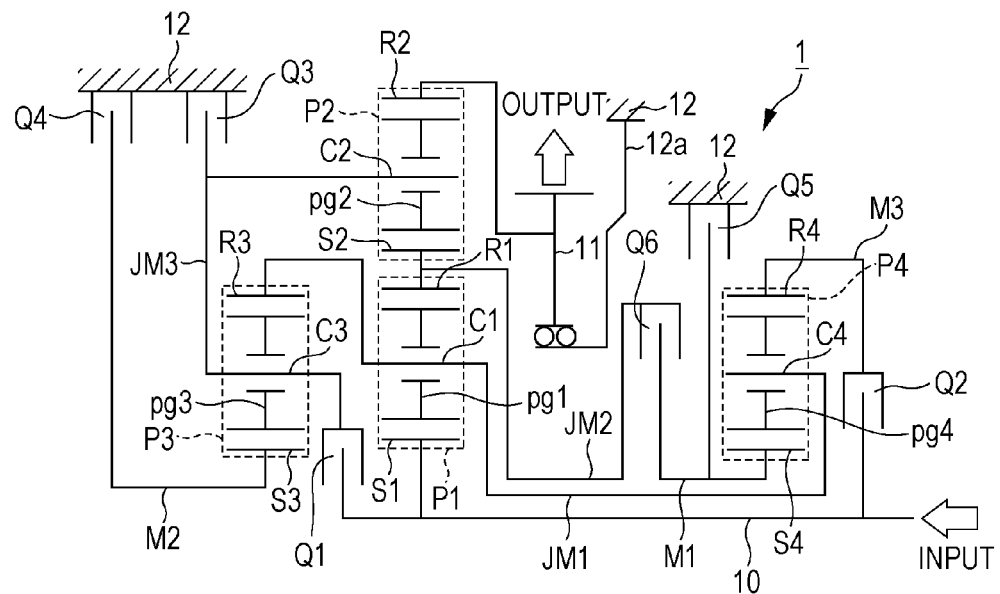
FIG. 1A is a skeleton diagram of an automatic transmission according to a first embodiment.

The embodiments will now be described with reference to the accompanying drawings, wherein like reference numerals designate corresponding or identical elements throughout the various drawings.

First Embodiment

FIG. 1A is a skeleton diagram of an automatic transmission 1 according to a first embodiment. The automatic transmission 1 includes an input shaft 10 and an output member 11. The input shaft 10 is rotatably and pivotally supported in a casing member 12 that constitutes a transmission case of the automatic transmission 1. The output member 11 is supported by a support member 12a so as to rotate coaxially with the input shaft 10. The support member 12a is supported by the casing member 12.

The input shaft 10 receives power input from a driving source (not illustrated) such as an internal combustion engine or a motor and is thus rotated by the power. A starting device may be provided between the input shaft 10 and the driving source. Providing the starting device brings about an effect of lessening a gear change shock. Examples of a starting device include a clutch-type starting device (such as a single-plate clutch or a multiplate clutch) and a hydraulic coupling starting device (such as a torque converter).

The output member 11 includes an output gear that is concentric with the input shaft 10. The rotation of the input shaft 10 is transmitted to the output member 11 after being subjected to a speed adjustment by transmission systems that will be described below. The rotation of the output member 11 is transmitted to driving wheels via, for example, a differential gear system, which is not illustrated.

The automatic transmission 1 includes first to fourth planetary gear sets P1 to P4 and first to sixth engagement assemblies Q1 to Q6, which serve as transmission systems. The first to fourth planetary gear sets P1 to P4 respectively include, as rotational components, sun gears S1 to S4, ring gears R1 to R4, and carriers C1 to C4 that support pinion gears pg1 to pg4. The first to fourth planetary gear sets P1 to P4 are arranged coaxially with the input shaft 10. In this embodiment, a single-pinion planetary gear set is employed for each of the first to fourth planetary gear sets P1 to P4.

In this embodiment, the second planetary gear set P2 is arranged further outward, in the radial direction of the input shaft 10, than the first planetary gear set P1 so as to be superposed with the first planetary gear set P1 with respect to the axial direction of the input shaft 10. With this arrangement, the length of the automatic transmission 1 is reduced in an axial direction of the automatic transmission 1 (in the axial direction of the input shaft 10). Thus, a space in which, for example, to transversely mount the shorter automatic transmission 1 in the vehicle can easily be secured.

In the above arrangement, the ring gear R1 of the first planetary gear set P1 and the sun gear S2 of the second planetary gear set P2 can be integrally formed. For example, part of a second joint member JM2 is formed into an annular member, a gear that is to become the ring gear R1 is formed on the inner circumferential surface of the annular member, and a gear that is to become the sun gear S2 is formed on the outer circumferential surface of the annular member. As a result, the size of the automatic transmission 1 can be decreased in the radial direction of the automatic transmission 1.

The first to sixth engagement assemblies Q1 to Q6 each releasably couple either one of the following combinations: at least two of the rotational components of the planetary gear sets P1 to P4; the input shaft 10 and at least one of the rotational components; and at least one of the rotational components and the casing member 12. In this embodiment, the engagement assemblies Q1, Q2, and Q6 are clutches and the engagement assemblies Q3 to Q5 are brakes. When each of the first to six engagement assemblies Q1 to Q6 is switched between an engaged state and a disengaged state, power transmission routes from the input shaft 10 to the output member 11 are changed from one to another and thus multiple gear speeds are achieved.

In this embodiment, the first to sixth engagement assemblies Q1 to Q6 are described as being frictional engagement assemblies. Examples of a frictional engagement assembly include a dry or wet single-plate clutch and a dry or wet multiplate clutch. In this embodiment, wet multiplate clutches are employed. Although a wet clutch can transmit a large amount of torque, it may cause frictional losses due to what is called drag when disengaged.

Figure 1B:
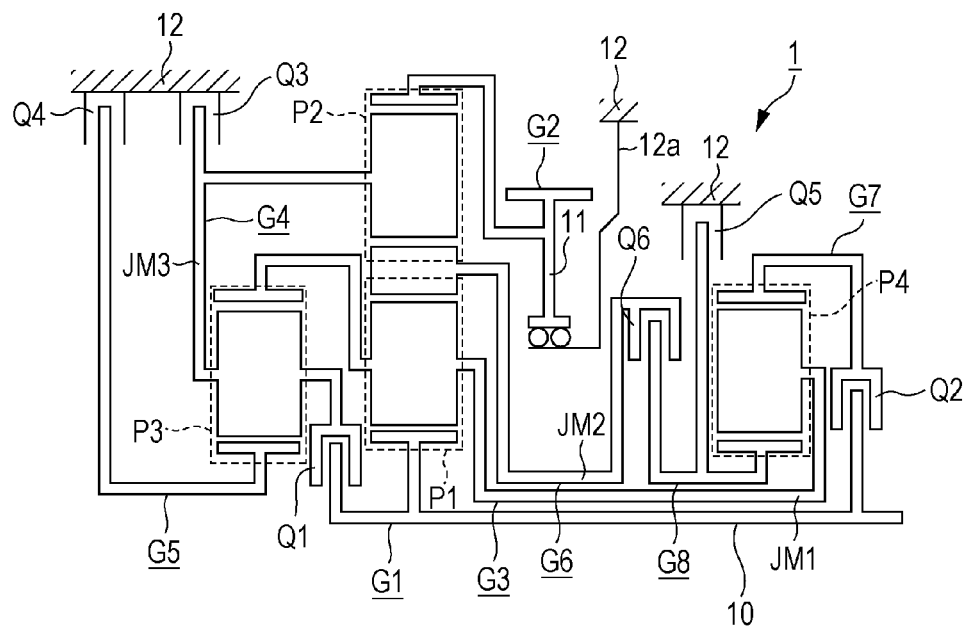
FIG. 1B is an illustration of components that rotate integrally.

Referring now to FIGS. 1A and 1B, coupling relationships between components will be described. FIG. 1B illustrates the components that rotate integrally. Specifically, the components in the groups G1 to G8 of the automatic transmission 1 are illustrated. In each of the groups G1 to G8, the components are coupled to one another with no engagement assemblies, and constantly and integrally rotate coaxially with the input shaft 10.

The sun gear S1 of the first planetary gear set P1 and the input shaft 10 are coupled to each other and constitute the group G1. The ring gear R2 of the second planetary gear set P2 and the output member 11 are coupled to each other and constitute the group G2.

The carrier C1 of the first planetary gear set P1 and the ring gear R3 of the third planetary gear set P3 are coupled to the carrier C4 of the fourth planetary gear set P4 via a first joint member JM1. The carrier C1, the ring gear R3, the carrier C4, and the first joint member JM1 constitute the group G3. The carrier C2 of the second planetary gear set P2 and the carrier C3 of the third planetary gear set P3 are coupled to each other via a third joint member JM3. The carrier C2, the carrier C3, and the third joint member JM3 constitute the group G4.

The sun gear S3 of the third planetary gear set P3 and a member M2 are coupled to each other and constitute the group G5. The ring gear R1 of the first planetary gear set P1 and the sun gear S2 of the second planetary gear set P2 are coupled to each other via the second joint member JM2. The ring gear R1, the sun gear S2, and the second joint member JM2 constitute the group G6. The ring gear R4 of the fourth planetary gear set P4 and the member M3 are coupled to each other and constitute the group G7. The sun gear S4 of the fourth planetary gear set P4 and the member M1 are coupled to each other and constitute the group G8.

The carrier C3 of the third planetary gear set P3 is releasably coupled to the input shaft 10 via the first engagement assembly Q1. Thus, the group G1 and the group G4 rotate together when the first engagement assembly Q1 is engaged. The ring gear R4 (with the member M3) of the fourth planetary gear set P4 is releasably coupled to the input shaft 10 via the second engagement assembly Q2. Thus, the group G1 and the group G7 rotate together when the second engagement assembly Q2 is engaged.

The third joint member JM3 and the casing member 12 are releasably coupled to each other via the third engagement assembly Q3. Thus, when the third engagement assembly Q3 is engaged, the group G4 is fixed to the casing member 12 and is in a stationary state. The sun gear S3 (with the member M2) of the third planetary gear set P3 and the casing member 12 are releasably coupled to each other via the fourth engagement assembly Q4. Thus, when the fourth engagement assembly Q4 is engaged, the group G5 is fixed to the casing member 12 and is in a stationary state.

The sun gear S4 (with the member M1) of the fourth planetary gear set P4 and the casing member 12 are releasably coupled to each other via the fifth engagement assembly Q5. Thus, when the fifth engagement assembly Q5 is engaged, the group G8 is fixed to the casing member 12 and is in a stationary state.

The second joint member JM2 and the sun gear S4 (with the member M1) of the fourth planetary gear set P4 are releasably coupled to each other via the sixth engagement assembly Q6. Thus, the group G6 and the group G8 rotate together when the sixth engagement assembly Q6 is engaged.

FIG. 2A is an engagement chart for showing an exemplary engagement status of the engagement assemblies Q1 to Q6. In FIG. 2A, "O" denotes an engaged state and a blank denotes a disengaged state. In addition, the row "Gear Ratio" shows gear ratios between the input shaft 10 and the output member 11.

In the automatic transmission 1 according to this embodiment, eight forward speeds and one reverse speed (RVS) are achieved by engaging three of the first to sixth engagement assemblies Q1 to Q6 at each gear speed. Accordingly, the automatic transmission 1 has fewer (three) engagement assemblies that are disengaged at each gear speed than in the known case where two engagement assemblies are engaged. Thus, the frictional losses can be decreased.

Note that the engaged state of the fifth engagement assembly Q5 at the first gear speed and the engaged state of the second engagement assembly Q2 at the fifth gear speed have no effect on power transmission between the input shaft 10 and the output member 11. However, if the fifth engagement assembly Q5 is engaged at the first gear speed, an effect of reducing the time required to upshift will be obtained, because the fifth engagement assembly Q5 is to be engaged at the second gear speed. Moreover, if the second engagement assembly Q2 is engaged at the fifth gear speed, an effect of reducing the time required to upshift and downshift will be obtained, because the second engagement assembly Q2 is to be engaged at the fourth and sixth gear speeds.

Figure 3:
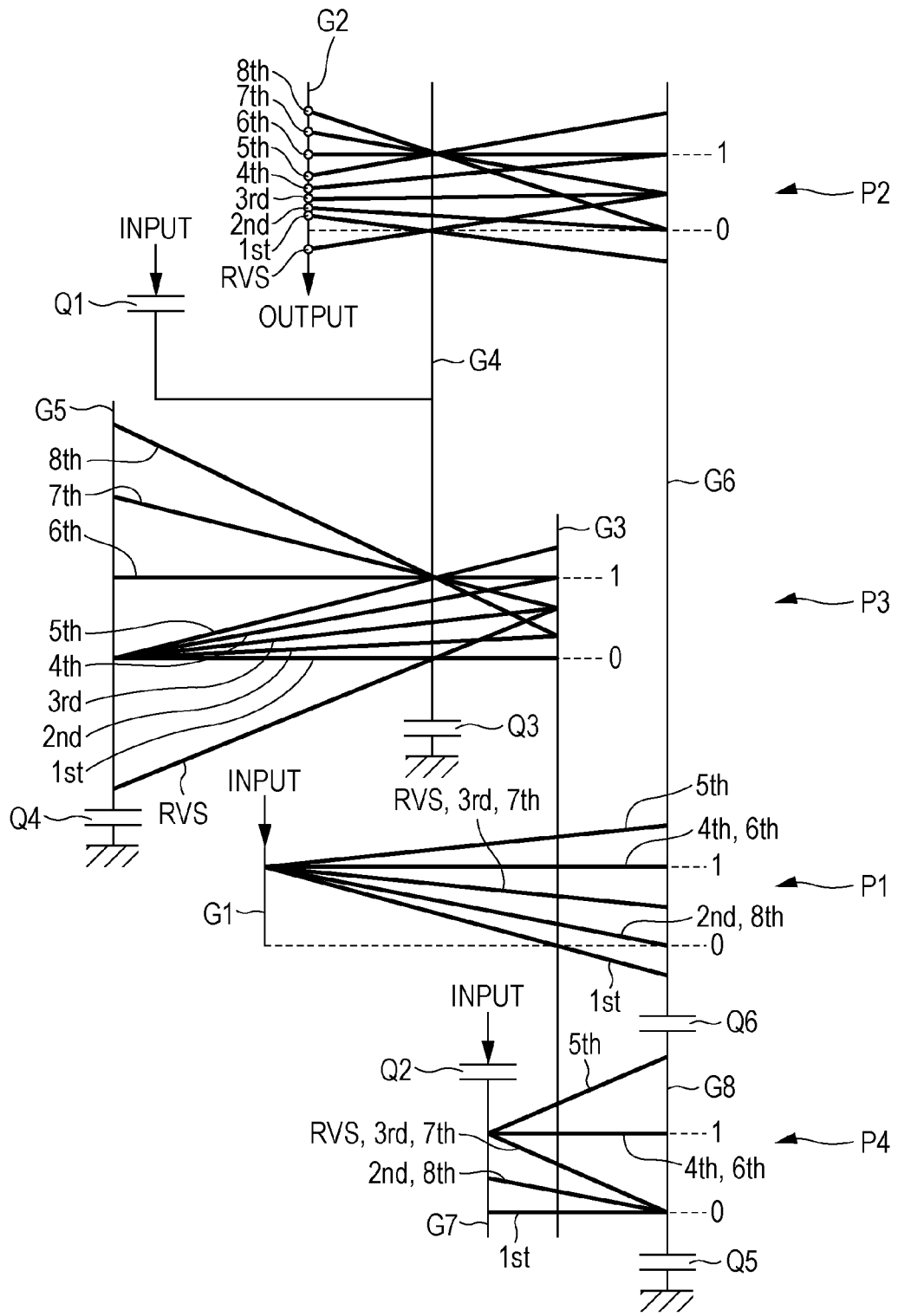
FIG. 3 is a velocity diagram for the automatic transmission according to the first embodiment.

FIG. 2B shows gear ratios (between the sun gear and the ring gear) of the planetary gear sets P1 to P4. FIG. 3 is a velocity diagram for the automatic transmission 1. The velocity diagram of FIG. 3 illustrates ratios of the number of rotations of each of the groups G1 to G8, with respect to the input that is input to the input shaft 10, for all the gear speeds. The vertical axis represents the speed ratio, "1" denotes that the number of rotations is equal to that of the input shaft 10 (the group G1), and "0" denotes that the group is stationary. The horizontal axis is based on the gear ratios between the rotational components of the first to fourth planetary gear sets P1 to P4.

For example, at the first gear speed, the third and fourth engagement assemblies Q3 and Q4 are engaged (see FIG. 2A), and thus the groups G4 and G5 are stopped. Consequently, the group G3 is also stopped. Here, the input that is input to the input shaft 10 causes the sun gear S2 (the group G6) of the second planetary gear set P2 to rotate via the first planetary gear set P1 as well as to rotate the ring gear R2 (the group G2) (while the carrier C2 (the group G4) is stopped).

At the first gear speed, the fifth engagement assembly Q5 is also engaged (see FIG. 2A). Thus, the group 8 is stopped together with the group 3 and consequently, the group G7 is also stopped. In the velocity chart of FIG. 3, the speed line for the first gear speed denoted by "1st" indicates "0" for each of the groups G3 to G5 and G7. Here, the group G6 is rotated (reversely), the group G2 is rotated via the second planetary gear set P2, and torque is output.

Instead of the engagement chart of FIG. 2A, an engagement chart shown in FIG. 4 is also employable. The engagement chart of FIG. 4 is different from the engagement chart of FIG. 2A in terms of the engagement assemblies engaged at the first gear speed and the fifth gear speed. Specifically, at the first gear speed, the fifth engagement assembly Q5 is engaged in the example shown in FIG. 2A, while the fifth engagement assembly Q5 is disengaged and the sixth engagement assembly Q6 is engaged in the example shown in FIG. 4. At the fifth gear speed, the second engagement assembly Q2 is engaged in the example shown in FIG. 2A, while the second engagement assembly Q2 is disengaged and the sixth engagement assembly Q6 is engaged in the example shown in FIG. 4.

In the example shown in FIG. 4, the engaged state of the sixth engagement assembly Q6 at the first gear speed and the engaged state of the sixth engagement assembly Q6 at the fifth gear speed have no effect on power transmission between the input shaft 10 and the output member 11. However, if the sixth engagement assembly Q6 is engaged at the first gear speed, an effect of reducing the time required to upshift will be obtained, because the sixth engagement assembly Q6 is to be engaged at the second gear speed. Moreover, if the sixth engagement assembly Q6 is engaged at the fifth gear speed, an effect of reducing the time required to upshift and downshift will be obtained, because the sixth engagement assembly Q6 is to be engaged at the fourth and sixth gear speeds.

Figure 7:
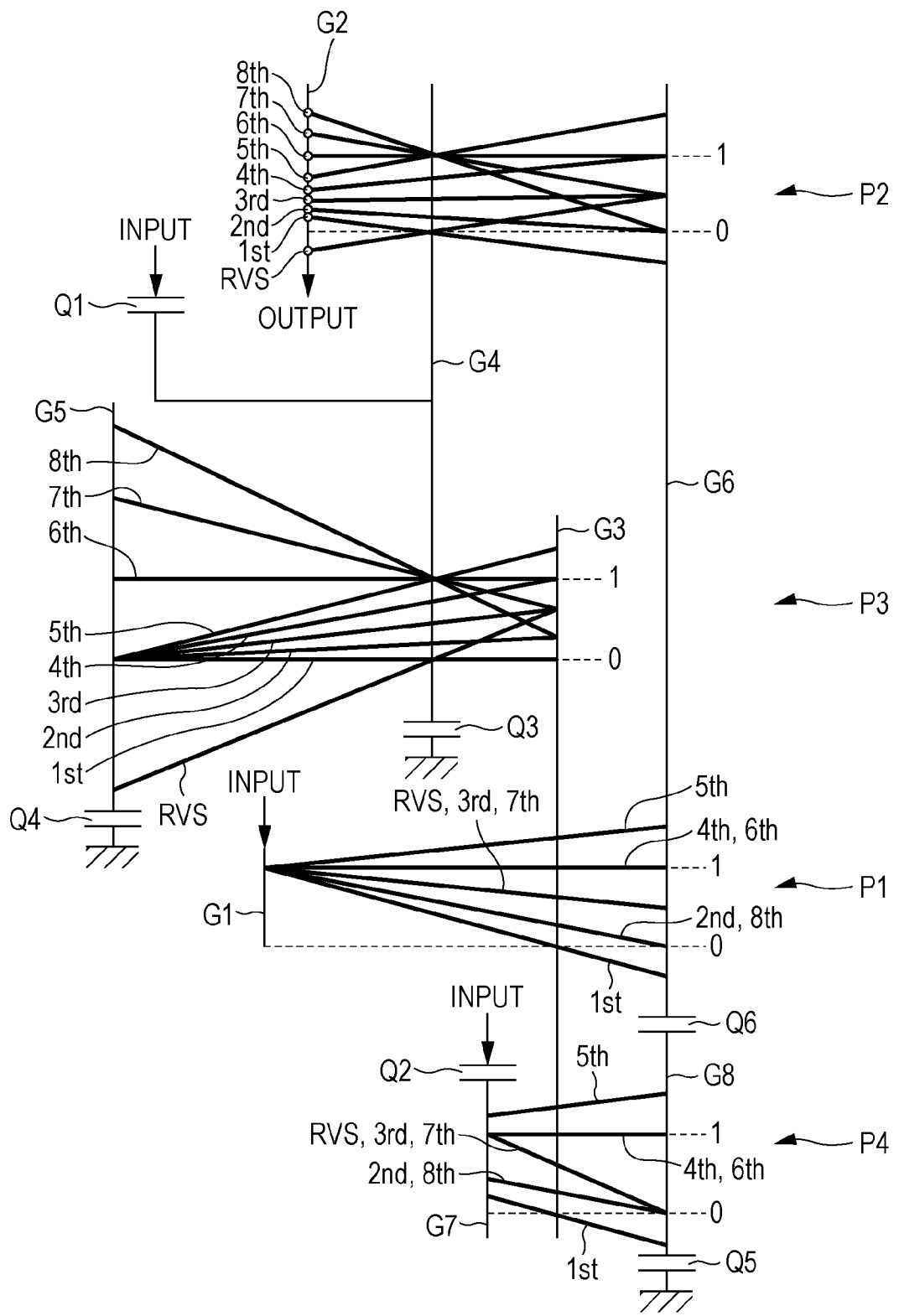
FIG. 7 is a velocity diagram for the automatic transmission according to the first embodiment in which the engagement chart shown in FIG. 4 is employed.

FIG. 7 is a velocity chart for the case where the engagement chart shown in FIG. 4 is employed. The velocity chart shown in FIG. 7 is different from the velocity chart shown in FIG. 3 only in terms of the speed lines for the fourth planetary gear set P4 at the first gear speed (1st) and the fifth gear speed (5th).

Second Embodiment

Although the first to sixth engagement assemblies Q1 to Q6 are described as being frictional engagement assemblies in the first embodiment, meshing-type engagement assemblies such as dog clutches/brakes may also be employed.

Compared with a frictional engagement assembly, a meshing-type engagement assembly substantially causes no frictional losses due to drag when disengaged. The meshing-type engagement assembly can also transmit a large amount of torque. On the other hand, the meshing-type engagement assembly causes a stronger gear change shock. For lessening the gear change shock, complex control or a longer time for changing from the disengaged state to the engaged state is required. For this reason, it is preferable that either the frictional engagement assembly or the meshing-type engagement assembly be used in accordance with the location.

Figure 5A:
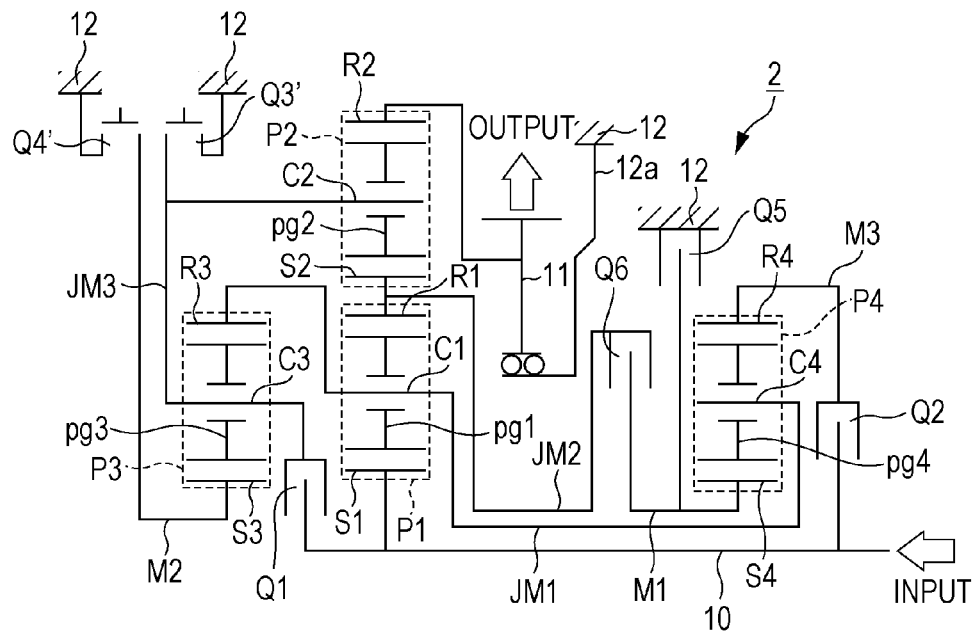
FIG. 5A is a skeleton diagram of an automatic transmission according to a second embodiment.

FIG. 5A is a skeleton diagram of an automatic transmission 2 according to a second embodiment. The structure of the automatic transmission 2 is almost the same as that of the automatic transmission 1 according to the first embodiment except that the automatic transmission 2 includes a third engagement assembly Q3' and a fourth engagement assembly Q4', which are dog brakes, that replace the third engagement assembly Q3 and the fourth engagement assembly Q4, respectively.

In the automatic transmission 1 according to the first embodiment, the third engagement assembly Q3 is engaged at the reverse gear speed and the first gear speed and disengaged at the other gear speeds (see FIG. 2A and FIG. 4). This means that the third engagement assembly Q3 is disengaged most of the time while the vehicle is travelling and thus greatly causes frictional losses. In addition, a large amount of torque is applied to an engagement assembly at the reverse gear speed or the first gear speed. To address this situation, a dog brake (the third engagement assembly Q3'), which substantially causes no frictional losses due to drag when disengaged, is employed in the second embodiment.

In the automatic transmission 1 according to the first embodiment, the fourth engagement assembly Q4 is engaged at the first to fifth gear speeds (see FIG. 2A and FIG. 4) to which the automatic transmission 1 is frequently set while the vehicle is travelling. At the reverse gear speed and the sixth to eighth gear speeds where the fourth engagement assembly Q4 is disengaged, the group 5 with which the fourth engagement assembly Q4 is supposed to be engaged rotates fast (see FIG. 3). The fourth engagement assembly Q4 thus greatly causes frictional losses. To address this situation, a dog brake (a fourth engagement assembly Q4'), which substantially causes no frictional losses due to drag when disengaged, is employed in the second embodiment.

Although dog clutches/brakes are employed as examples in this embodiment, two-way clutches/brakes are also employable. For example, two-way brakes may be employed as the third and fourth engagement assemblies Q3 and Q4 of the automatic transmission 1 according to the first embodiment. Employing two-way brakes also brings about an effect of decreasing the frictional losses.

Third Embodiment

Since dog brakes are employed as the third and fourth engagement assemblies Q3' and Q4' in the second embodiment, a gear change shock caused during a gear change from the neutral gear to the first gear speed may become larger. More specifically, when a torque converter or the like is used as a starting device, the input shaft 10 is also rotating at the neutral gear, and thus the groups G4 and G5 illustrated in FIG. 1B also rotate, to which the third and fourth engagement assemblies Q3' and Q4' are supposed to be engaged, respectively. For this reason, when the third and fourth engagement assemblies Q3' and Q4' are engaged according to the engagement chart shown in FIG. 2A or 4, the engagements are not performed smoothly and a large gear change shock may occur during a gear change from the neutral gear to the first gear speed. To address this situation, another engagement assembly may be additionally provided.

Figure 5B:
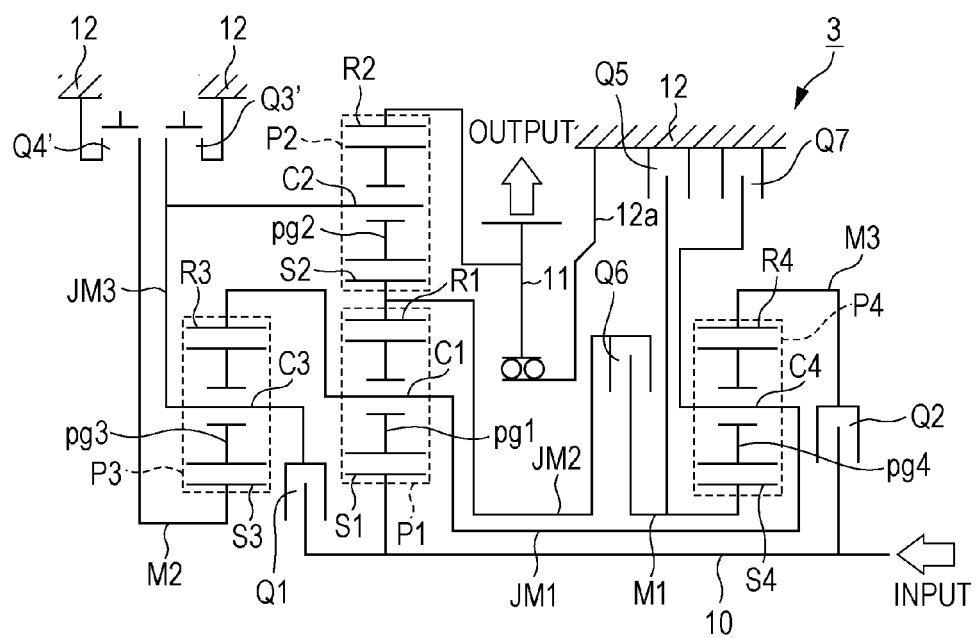
FIG. 5B is a skeleton diagram of an automatic transmission according to a third embodiment.

FIG. 5B is a skeleton diagram of an automatic transmission 3 according to a third embodiment. The structure of the automatic transmission 3 is almost the same as that of the automatic transmission 2 (see FIG. 5A) according to the second embodiment except that the automatic transmission 3 additionally includes a seventh engagement assembly Q7. The seventh engagement assembly Q7 is an engagement assembly that releasably couples the carrier C4 (the group G3) of the fourth planetary gear set P4 to the casing member 12. The seventh engagement assembly Q7 is described as a frictional engagement assembly in this embodiment.

When a gear change is to be performed from the neutral gear to the first gear speed, the seventh engagement assembly Q7 is engaged before the third and fourth engagement assemblies Q3' and Q4' are engaged so that the group G3 is rotated at a slower speed or stopped. As a consequence, the groups G4 and G5 are rotated at a slower speed or stopped. Thus, the third and fourth engagement assemblies Q3' and Q4' are allowed to be engaged smoothly with a smaller gear change shock. As described, since the seventh engagement assembly Q7 is provided for the reduction of the gear change shock by reducing or stopping the rotations of the groups G3 to G5, the seventh engagement assembly Q7 only needs to transmit a relatively small amount of torque.

Fourth Embodiment

In the first embodiment, the length of the automatic transmission 1 in the axial direction is decreased by arranging the second planetary gear set P2 further outward, in the radial direction of the input shaft 10, than the first planetary gear set P1 so that the second planetary gear set P2 is superposed with the first planetary gear set P1 with respect to the axial direction of the input shaft 10. However, the length of an automatic transmission in the axial direction may be further decreased.

Figure 6A:
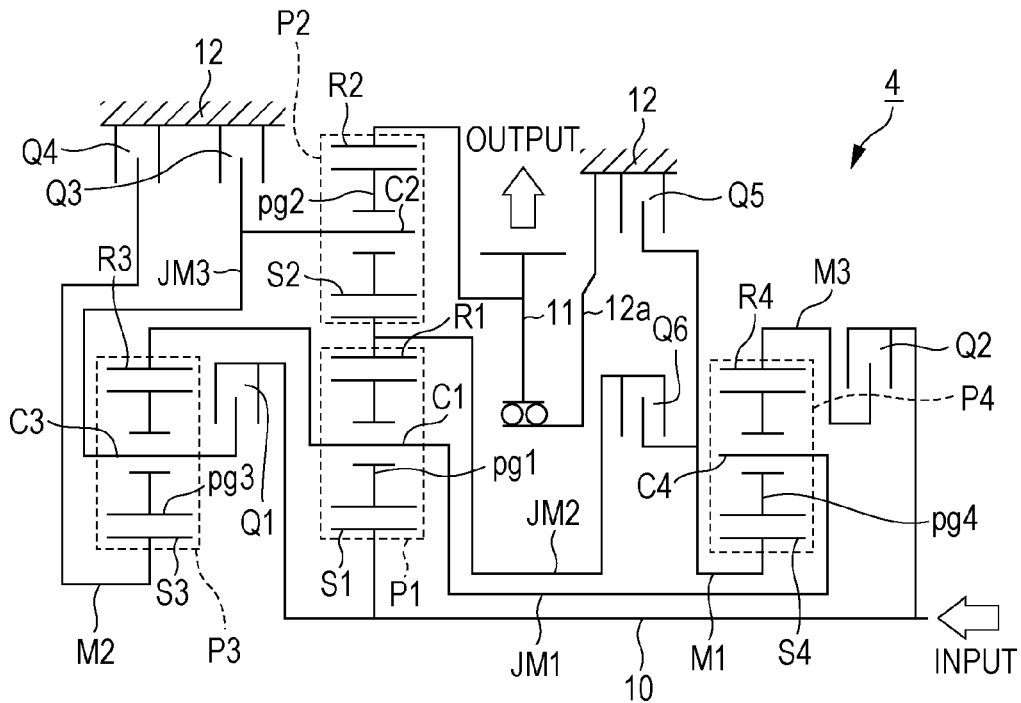
FIG. 6A is a skeleton diagram of an automatic transmission according to a fourth embodiment.

FIG. 6A is a skeleton diagram of an automatic transmission 4 according to a fourth embodiment. The automatic transmission 4 is different from the automatic transmission 1 according to the first embodiment only in the arrangement of the components.

In the automatic transmission 4 according to this embodiment, the fourth planetary gear set P4, the output member 11, the first and second planetary gear sets P1 and P2, and the third planetary gear set P3 are arranged in this order in the axial direction of the input shaft 10. The fifth and sixth engagement assemblies Q5 and Q6 are arranged between the fourth planetary gear set P4 and the output member 11. The first engagement assembly Q1 is arranged between the first and third planetary gear sets P1 and P3.

The fifth engagement assembly Q5 is arranged further outward, in the radial direction of the input shaft 10, than the sixth engagement assembly Q6 so as to be superposed with the sixth engagement assembly Q6 with respect to the axial direction of the input shaft 10. The fourth engagement assembly Q4 is arranged further outward, in the radial direction of the input shaft 10, than the third planetary gear set P3 so as to be superposed with the third planetary gear set P3 with respect to the axial direction of the input shaft 10. The third engagement assembly Q3 is arranged further outward, in the radial direction of the input shaft 10, than the first engagement assembly Q1 so as to be superposed with the first engagement assembly Q1 with respect to the axial direction of the input shaft 10.

With these arrangements, the length of the automatic transmission 1 in the axial direction may be further decreased. Thus, a space in which, for example, to transversely mount the shorter automatic transmission 1 in the vehicle can easily be secured.

Fifth Embodiment

Figure 6B:
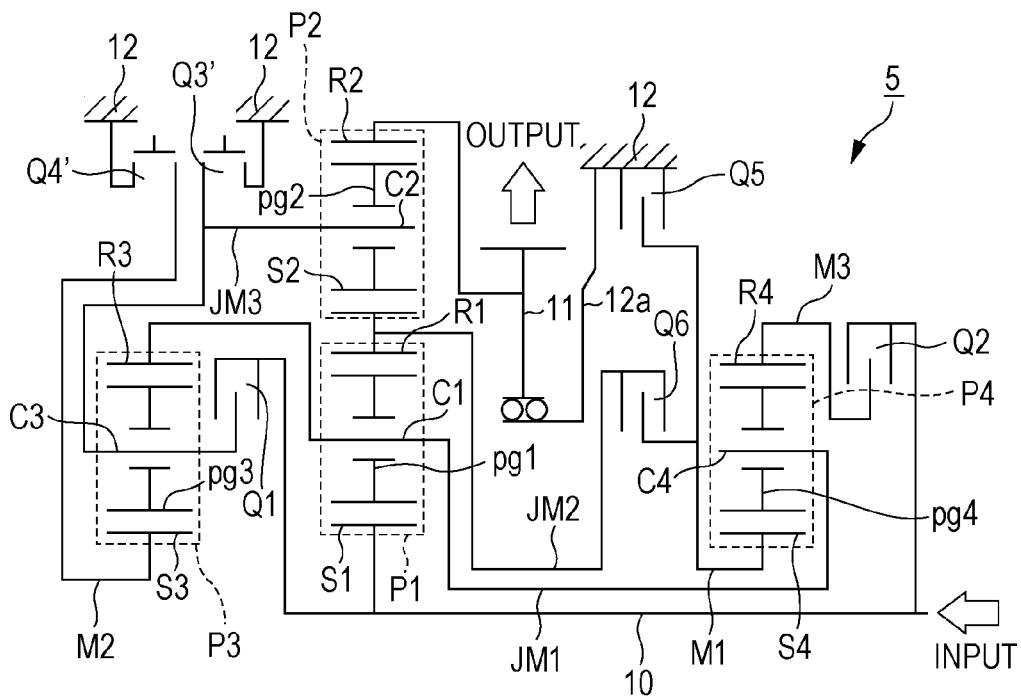
FIG. 6B is a skeleton diagram of an automatic transmission according to a fifth embodiment.

FIG. 6B is a skeleton diagram of an automatic transmission 5 according to a fifth embodiment. The automatic transmission 5 is a combination of the automatic transmission 4 according to the fourth embodiment and the automatic transmission 2 according to the second embodiment. Specifically, the automatic transmission 5 is obtained by replacing the third engagement assembly Q3 and the fourth engagement assembly Q4 in the automatic transmission 4 according to the fourth embodiment with the third and fourth engagement assemblies Q3' and Q4', which are dog brakes, in the automatic transmission 2 according to the second embodiment. The automatic transmission 5 having this structure has both advantages described in relation to the second and fourth embodiments.

According to an embodiment of the invention, an automatic transmission is provided that includes an input shaft that is rotated by power input from a driving source; an output member that allows rotation of the input shaft to be transmitted thereto after the rotation has been subjected to a speed adjustment; first to fourth planetary gear sets that each include a sun gear, a ring gear, and a carrier as rotational components, the carrier supporting a pinion gear; and first to sixth engagement assemblies that each releasably couple either at least two of the rotational components to each other, the input shaft to at least one of the rotational components, or at least one of the rotational components to a casing member. A first rotational component of the first planetary gear set is coupled to the input shaft. A first rotational component of the second planetary gear set is coupled to the output member. A first rotational component of the third planetary gear set is releasably coupled to the input shaft via the first engagement assembly. A first rotational component of the fourth planetary gear set is releasably coupled to the input shaft via the second engagement assembly. A second rotational component of the first planetary gear set, a second rotational component of the third planetary gear set, and a second rotational component of the fourth planetary gear set are coupled to one another via a first joint member. A third rotational component of the first planetary gear set and a second rotational component of the second planetary gear set are coupled to each other via a second joint member. A third rotational component of the second planetary gear set and the first rotational component of the third planetary gear set are coupled to each other via a third joint member. The third joint member and the casing member are releasably coupled to each other via the third engagement assembly. A third rotational component of the third planetary gear set and the casing member are releasably coupled to each other via the fourth engagement assembly. A third rotational component of the fourth planetary gear set and the casing member are releasably coupled to each other via the fifth engagement assembly. The second joint member and the third rotational component of the fourth planetary gear set are releasably coupled to each other via the sixth engagement assembly. Three of the first to sixth engagement assemblies are engaged at each gear speed.

In the automatic transmission according to an embodiment of the invention, three of the first to sixth engagement assemblies are engaged at a gear speed. Accordingly, the automatic transmission has fewer (three) engagement assemblies that are disengaged at each gear speed than in the known case where two engagement assemblies are engaged. Thus, the frictional losses can be decreased.

The second planetary gear set may be arranged further outward, in a radial direction of the input shaft, than the first planetary gear set so as to be superposed with the first planetary gear set with respect to an axial direction of the input shaft. The third rotational component of the first planetary gear set and the second rotational component of the second planetary gear set may be integrally formed. With this structure, the length of the automatic transmission can be decreased in the axial direction of the automatic transmission.

The fourth planetary gear set, the output member, the first and second planetary gear sets, and the third planetary gear set may be arranged in this order in the axial direction of the input shaft. The fifth and sixth engagement assemblies may be arranged between the fourth planetary gear set and the output member. The fifth engagement assembly may be arranged further outward, in the radial direction of the input shaft, than the sixth engagement assembly so as to be superposed with the sixth engagement assembly with respect to the axial direction of the input shaft. The first engagement assembly may be arranged between the first planetary gear set and the third planetary gear set. The third engagement assembly may be arranged further outward, in the radial direction of the input shaft, than the first engagement assembly so as to be superposed with the first engagement assembly with respect to the axial direction of the input shaft. The fourth engagement assembly may be arranged further outward, in the radial direction of the input shaft, than the third planetary gear set so as to be superposed with the third planetary gear set with respect to the axial direction of the input shaft. With this structure, the length of the automatic transmission can be decreased in the axial direction of the automatic transmission.

At least one of the third and fourth engagement assemblies may be a meshing-type engagement assembly. With this structure, the frictional losses can be further decreased.

At least one of the third and fourth engagement assemblies may be a two-way clutch. With this structure, the frictional losses can be further decreased.

The third and fourth engagement assemblies may be meshing-type engagement assemblies. The automatic transmission may further include a seventh engagement assembly that releasably couples the second rotational component of the fourth planetary gear set to the casing member. With this structure, the frictional losses can be further decreased while a gear change shock caused by employing the meshing-type engagement assemblies is lessened.

The automatic transmission may further include a clutch-type starting device arranged between the input shaft and the driving source. In addition, the automatic transmission may further include a hydraulic coupling starting device arranged between the input shaft and the driving source.

According to an embodiment of the present invention, fewer engagement assemblies are disengaged at each gear speed and thus the frictional losses can be decreased.

Obviously, numerous modifications and variations of the present invention are possible in light of the above teachings. It is therefore to be understood that within the scope of the appended claims, the invention may be practiced otherwise than as specifically described herein.

What is claimed is:

1. An automatic transmission comprising:
    an input shaft configured to be rotated with power of a driving source relative to a casing member, rotation of the input shaft being changed into rotation at a plurality of rotational speeds through a plurality of gear ratios;
    an output member to output rotation of the input shaft;
    a first planetary gear set including a first sun gear, a first ring gear, and a first carrier supporting a first pinion gear;
    a second planetary gear set including a second sun gear, a second ring gear, and a second carrier supporting a second pinion gear;
    a third planetary gear set including a third sun gear, a third ring gear, and a third carrier supporting a third pinion gear;
    a fourth planetary gear set including a fourth sun gear, a fourth ring gear, and a fourth carrier supporting a fourth pinion gear;

an engagement mechanism including first to sixth engagement assemblies;

the first sun gear, the first ring gear, and the first carrier being defined as a first rotary element, a second rotary element, and a third rotary element in the first planetary gear set;

the second sun gear, the second ring gear, and the second carrier being defined as a first rotary element, a second rotary element, and a third rotary element in the second planetary gear set;

the third sun gear, the third ring gear, and the third carrier being defined as a first rotary element, a second rotary element, and a third rotary element in the third planetary gear set;

the fourth sun gear, the fourth ring gear, and the fourth carrier being defined as a first rotary element, a second rotary element, and a third rotary element in the fourth planetary gear set;

each of the first to sixth engagement assemblies being configured to releasably couple at least two of the first to third rotary elements included in each of the first to fourth planetary gear sets to each other, to releasably couple the input shaft to at least one of the first to third rotary elements included in each of the first to fourth planetary gear sets, or to releasably couple at least one of the first to third rotary elements included in each of the first to fourth planetary gear sets to the casing member;

the first rotary element of the first planetary gear set being coupled to the input shaft;

the first rotary element of the second planetary gear set being coupled to the output member;

the first rotary element of the third planetary gear set being releasably coupled to the input shaft via the first engagement assembly;

the first rotary element of the fourth planetary gear set being releasably coupled to the input shaft via the second engagement assembly;

the second rotary element of the first planetary gear set, the second rotary element of the third planetary gear set, and the second rotary element of the fourth planetary gear set being coupled to one another via a first joint member;

the third rotary element of the first planetary gear set and the second rotary element of the second planetary gear set being coupled to each other via a second joint member;

the third rotary element of the second planetary gear set and the first rotary element of the third planetary gear set being coupled to each other via a third joint member;

the third joint member and the casing member being releasably coupled to each other via the third engagement assembly;

the third rotary element of the third planetary gear set and the casing member being releasably coupled to each other via the fourth engagement assembly;

the third rotary element of the fourth planetary gear set and the casing member being releasably coupled to each other via the fifth engagement assembly;

the second joint member and the third rotary element of the fourth planetary gear set being releasably coupled to each other via the sixth engagement assembly; and each of the plurality of gear ratios being provided by setting three of the first to sixth engagement assemblies in a engagement state.

2. The automatic transmission according to claim 1, wherein the second planetary gear set is arranged radially outward of the first planetary gear set to be superposed with the first planetary gear set with respect to an axial direction of the input shaft, and wherein the third rotary element of the first planetary gear set and the second rotary element of the second planetary gear set are integrally formed.

3. The automatic transmission according to claim 2, wherein the fourth planetary gear set, the output member, the first and second planetary gear sets, and the third planetary gear set are arranged in sequence along the axial direction of the input shaft, wherein the fifth and sixth engagement assemblies are arranged between the fourth planetary gear set and the output member, wherein the fifth engagement assembly is arranged radially outward of the sixth engagement assembly to be superposed with the sixth engagement assembly with respect to the axial direction of the input shaft, wherein the first engagement assembly is arranged between the first planetary gear set and the third planetary gear set, wherein the third engagement assembly is arranged radially outward of the first engagement assembly to be superposed with the first engagement assembly with respect to the axial direction of the input shaft, and wherein the fourth engagement assembly is arranged radially outward of the third planetary gear set to be superposed with the third planetary gear set with respect to the axial direction of the input shaft.

4. The automatic transmission according to claim 1, wherein at least one of the third and fourth engagement assemblies comprises a meshing-type engagement assembly.

5. The automatic transmission according to claim 1, wherein at least one of the third and fourth engagement assemblies comprises a two-way clutch.

6. The automatic transmission according to claim 1, further comprising:

a seventh engagement assembly configured to releasably couple the second rotary element of the fourth planetary gear set to the casing member, wherein each of the third and fourth engagement assemblies comprises a meshing-type engagement assembly.

7. The automatic transmission according to claim 1, further comprising:

a clutch-type starting device arranged between the input shaft and the driving source.

8. The automatic transmission according to claim 1, further comprising:

a hydraulic coupling starting device arranged between the input shaft and the driving source.

9. The automatic transmission according to claim 1, wherein the first sun gear is defined as the first rotary element of the first planetary gear set, the second ring gear is defined as the first rotary element of the second planetary gear set, the third carrier is defined as the first rotary element of the third planetary gear set, and the fourth ring gear is defined as the first rotary element of the fourth planetary gear set.

10. The automatic transmission according to claim 1, wherein the first carrier is defined as the second rotary element of the first planetary gear set, the third ring gear is defined as the second rotary element of the third planetary gear set, and the fourth carrier is defined as the second rotary element of the fourth planetary gear set.

* * * * *